(12) United States Patent
Varga et al.

(10) Patent No.: US 9,451,321 B2
(45) Date of Patent: Sep. 20, 2016

(54) CONTENT MANAGEMENT WITH BIOMETRIC FEATURE RECOGNITION

(71) Applicant: Red Hat, Inc., Raleigh, NC (US)

(72) Inventors: Daniel Brian Varga, Raleigh, NC (US); Spenser E. Shumaker, Raleigh, NC (US); Keith Allen Robertson, Wake Forest, NC (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 14/332,812

(22) Filed: Jul. 16, 2014

(65) Prior Publication Data

US 2016/0021423 A1   Jan. 21, 2016

(51) Int. Cl.
*H04N 21/442* (2011.01)
*H04H 60/45* (2008.01)
*H04N 21/4415* (2011.01)
*H04N 21/258* (2011.01)

(52) U.S. Cl.
CPC .......... *H04N 21/4415* (2013.01); *H04H 60/45* (2013.01); *H04N 21/25866* (2013.01); *H04N 21/44222* (2013.01)

(58) Field of Classification Search
CPC ........... H04N 21/44222; H04N 60/45; H04N 21/25866; H04N 21/4415; H04N 21/42201; H04N 21/42203; H04N 21/4223; H04N 21/4394; H04N 21/44008; H04N 21/4402
See application file for complete search history.

(56) References Cited

U.S. PATENT DOCUMENTS

| | | | |
|---|---|---|---|
| 8,887,187 B2 * | 11/2014 | Ohmae et al. | 725/14 |
| 2007/0157237 A1 * | 7/2007 | Cordray et al. | 725/42 |
| 2011/0243530 A1 * | 10/2011 | Kashima et al. | 386/248 |

* cited by examiner

*Primary Examiner* — Rong Le
(74) *Attorney, Agent, or Firm* — Haynes and Boone, LLP

(57) ABSTRACT

A method includes storing metadata associated with content from at least one content source, determining that the content is being presented, receiving data representing a biometric attribute associated with a content consumer, determining that the content consumer is consuming the content, and updating the metadata associated with the content in response to determining that the content consumer is consuming the content.

19 Claims, 6 Drawing Sheets

CONTENT MANAGEMENT WITH BIOMETRIC FEATURE RECOGNITION

BACKGROUND

The present disclosure relates generally to content management, and more particularly to methods and systems for using biometric feature recognition for content management.

People regularly consume various types of content from a variety of sources. For example, people consume video content from various provider services such as cable or satellite television service providers or Internet streaming service providers. Such services generally allow a content consumer to have a set of content that is of interest to that content consumer. The set of content may be in the form of a queue.

In some cases, multiple content consumers may share the same mode of consumption. For example, in the case of a Digital Video Recorder (DVR) provided to a household by a cable television service provider, multiple content consumers within the household may have their own content set stored in the DVR. Some content consumers may have content in their sets that overlap with content from sets of other content consumers. Additionally, each content consumer may have content that is of interest only to them and to no other content consumers in the household. It is desirable to have efficient ways of managing such content in order to ease consumption of such content by multiple content consumers.

SUMMARY

According to one example, a method includes storing metadata associated with content from at least one content source, determining that the content is being presented, receiving data representing a biometric attribute associated with a content consumer, determining that the content consumer is consuming the content, and updating the metadata associated with the content in response to determining that the content consumer is consuming the content.

According to one example, a system includes a processor and a memory comprising machine readable instructions that when executed by the processor, cause the system to store metadata associated with content from at least one content source, determine that the content is being presented, receive data representing a biometric attribute associated with a content consumer, determine that the content consumer is consuming the content, and update the metadata associated with the content in response to determining that the content consumer is consuming the content.

According to one example, a non-transitory computer readable medium comprising computer readable code for execution on a processing system, the computer readable program code comprising computer readable program code to store metadata associated with content from at least one content source, computer readable program code to determine that the content is being presented, computer readable program code to receive data representing a biometric attribute associated with a content consumer, computer readable program code to determine that the content consumer is consuming the content, and computer readable program code to update the metadata associated with the content in response to determining that the content consumer is consuming the content.

DETAILED DESCRIPTION

Glossary

Figure 1:
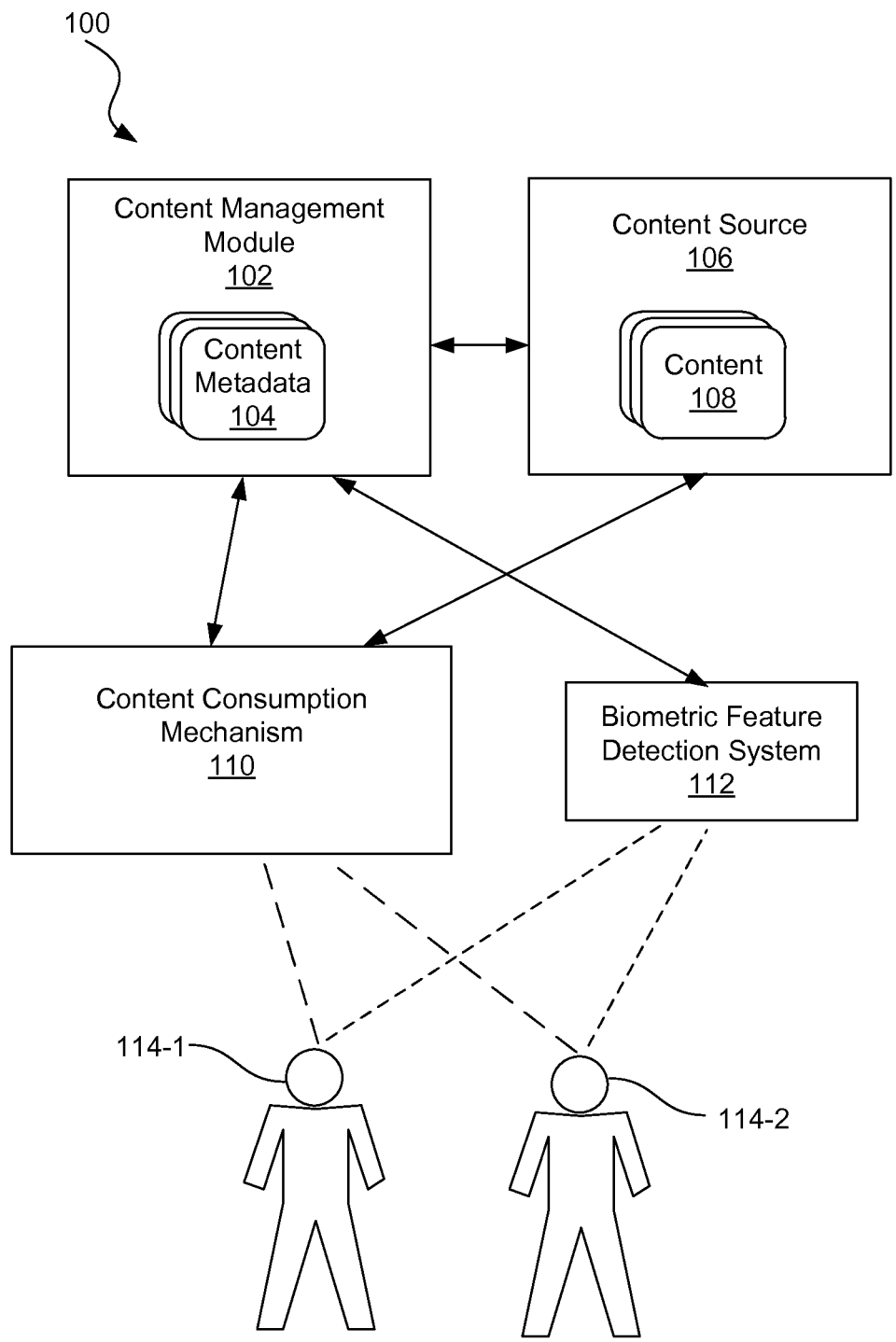
FIG. 1 is a diagram showing an illustrative system for content management that utilizes biometric feature recognition, according to one example of principles described herein.

Content: One or more units of material that is presentable to a user through a medium. For example, content may include video, audio, image, and text, or any combination of one or more of the foregoing.

Content Management Module: Hardware, software, or a combination of both, that manages content that is associated with one or more sources of content.

Content Set: A grouping of content or metadata about the content. A content set may be empty at a given time. Content sets may be associated with one or more content consumers.

Content Source: An entity or component from, or through, which content is received. For example, a content source may be a video streaming service, a cable or satellite television provider service, or an internet content service provider. Other examples include a Digital Video Recorder (DVR) or a home Personal Computer (PC).

Presentation Region: A space in which content is consumable from an object presenting the content. For example, a presentation region may be a space such as a room in which a video presentation is made available. The presentation region may also be the distance from an object presenting the content, the distance such that a content consumer is able to appropriately consume content.

Content Consumer: A person or entity that is capable of interacting with content in order to consume the content.

Consume: An appearance of engagement with respect to content. The manner of engagement varies based on the type of content. For example, a content consumer may engage a piece of video, image, or text content when the content consumer is facing the content. A content consumer may appear to be engaged with content if the content consumer is within the presentation region of the content.

Present: To make content available, regardless of whether that content is consumed by a user. For example, presenting video content may include displaying a video on a television screen. Presented content may or may not be consumed by various content consumers.

Biometric Attribute: A biometric feature that is associated with a particular content consumer to distinguish that content consumer from other content consumers. For example, a biometric feature may be one or more facial features that are detectable through a facial recognition mechanism.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to have efficient ways of managing such content in order to ease consumption of such content by multiple content consumers. According to certain examples of principles described herein, a content management system utilizes a biometric feature recognition system such as a facial recognition system to determine which content consumers consume which pieces of content. For example, during playback of a piece of video content, the facial recognition system may determine which content consumers are present, and assume that such content consumers have consumed the piece of video content being played. The content management system can then indicate that those content consumers have consumed, or watched, the content. Information as to which content consumers have consumed which pieces of content may be useful in a variety of situations. For example, when multiple content consumers are in the room, the selection of content for viewing may be filtered such that only content not already consumed by any content consumer in the room is displayed. Other uses, including those that will be described in more detail below, may also be used in accordance with principles described herein.

FIG. 1 is a diagram showing an illustrative system 100 for content management that utilizes biometric feature recognition. According to the present example, the system 100 includes a content management module 102, a content source 106, a content consumption mechanism 119 and a biometric feature detection system 112. Content consumers 114 may consume content through the content consumption mechanism. Additionally, the biometric feature detection system 112 may be able to identify the content consumers 114 and determine that they are consuming the content.

According to the present example, the content management module 102 stores content metadata 104. For example, in the case where the content is video content, the content metadata may include the title of the content and an image representing the content such that a content consumer can identify the content based on the content metadata. In the case where the content is music content, the content metadata 104 may indicate the title of the song and the artist of the song. In the case where the content is text content, such as news articles, then the content metadata 104 may include the title of the article as well as the author of the article. The content management module 102 may be implemented as hardware, software, or combination of both.

According to the present example, the content source 106 is a system that stores content 108 and makes that content available to content consumers. For example, in the case of video content, the content source 106 may be associated with an internet streaming company. The content source 106 may refer to the internet streaming company itself or to any equipment operated or used by the company to get the content 108 to end content consumers. For example, the content source may include database servers that store the content 108, intermediate servers that temporarily store the content 108 or portions of the content as the content 108 is in transit, or data transmission systems such as satellite systems. The content source 108 may also be a local storage owned by the content consumers 114.

According to the present example, the content consumption mechanism 110 provides content to content consumers in a manner consistent with the type of content being consumed. For example, in the case of video content, the content consumption mechanism 110 may be a television screen, projector screen, computer monitor display, tablet display, or any other type of display device. In the case of audio content, the content consumption mechanism 110 may be speakers or headphones.

The biometric feature detection system 112 is able to identify a feature of content consumers and distinguish those content consumers from other content consumers. For example, the biometric feature detection system 112 may be a facial recognition system. The facial recognition system may include one or more cameras that can determine the content consumers who are in the room while content is being displayed. Thus, it can be assumed that the content consumers 114 are consuming the content. In some examples, the one or more cameras may be used to identify content consumers based on features besides a face. For example, the feature detection system may analyze images to identify distinguishing features such as facial features, face size, body type and/or size, etc.

Other types of biometric feature detections systems are contemplated as well. For example, the biometric feature detection system 112 may be a heat sensor that is able to identify persons based on heat signatures. The biometric feature detection system 112 may be a voice recognition system that distinguishes and identifies content consumers based on their voices. The biometric feature detection system 112 may be a retinal scanner that scans the retinas of present content consumers. The biometric feature detection system 112 may be a fingerprint scanner. In such a case, all of the content consumers who are present may sign-in using the fingerprint scanner so that the content management module knows who is consuming the content.

In some cases, the biometric feature detection system 112 may include additional functionality to better determine whether a content consumer 114 is consuming content that is being provided. For example, the biometric feature detection system may determine that a content consumer is present, but that the content consumer's eyes are directed elsewhere. Thus, it can be assumed that the content consumer is not consuming the content being displayed by the content consumption mechanism 110. For example, it may be the case that two content consumers 114-1, 114-2 are in the room. The first content consumer's 114-1 eyes are directed towards the content consumption mechanism 110 while the second content consumer's 114-2 eyes are directed elsewhere. Thus, it can be assumed that the first content consumer 114-1 consumed the content and the second content consumer 114-2 did not consume the content.

In some examples, the content management module 102 may be associated with the content source. For example, in the case where the content source is a cable or satellite television provider service that provides a DVR, the content management module 102 may be integrated with the DVR. Thus, each content consumer within the household may indicate a set of content that is of interest to that content consumer through the DVR interface. As those content consumers consume content, the content management module 102 aspect of the DVR can keep track of which content consumers have viewed which pieces of content and which content consumers have not viewed the content.

In some examples, the content management module 102 is integrated with the content consumption mechanism 110. For example, the content management module 102 may be integrated with a television set. The content management module 102 may then display content metadata 104 from a variety of different content sources 106.

In some examples, the content management module 102 is a stand-alone device that operates in concert with the content consumption mechanism 110 and the content source. The content management module 102 may thus store content metadata 104 representing content 108 from a variety of different sources. Specifically, the content module may interact with systems from an internet streaming service provider to display the appropriate content metadata 104 for content to which the content consumer 114 subscribes. Additionally, the content module 104 may display content from a television service provider. For example, the content module may communicate with a device such as a DVR to determine what content is available through the television service provider. Additionally, the content module 102 may interact with a local content store to obtain content 108.

The biometric feature detection system 112 may be a stand-alone device that communicates with the content management module 102. In some examples, however, the biometric feature detection system 112 may be integrated with the content management module or whatever device with which the content management module 102 is integrated.

Figure 2:
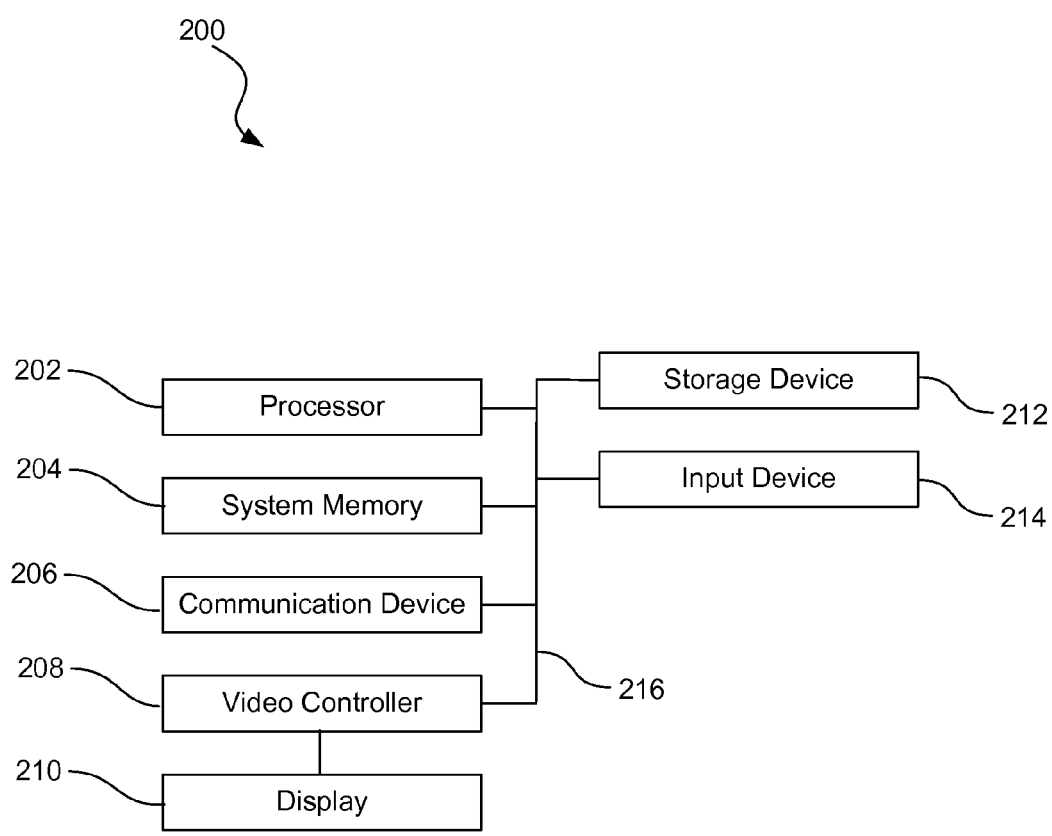
FIG. 2 is a diagram showing an illustrative computing system that can be used for content management with biometric feature recognition, according to one example of principles described herein.

FIG. 2 is a diagram showing an illustrative computing system 200 that may be used to perform the functions of the content management module 102. According to the present example, the computing system 200 includes a processor 202, an input device 214, a storage device 212, a video controller 208, a system memory 204, a display 210, and a communication device 206, all of which are interconnected by one or more buses 216.

In some examples, the storage device 212 may include a floppy drive, hard drive, CD-ROM, optical drive, any other form of storage device and/or any combination thereof. In several exemplary embodiments, the storage device 212 may include, and/or be capable of receiving, a floppy disk, CD-ROM, DVD-ROM, or any other form of computer readable medium that may contain executable instructions. In one example, the computer readable medium is a non-transitory tangible media.

In some examples, the communication device 206 may include a modem, network card, or any other device to enable the computing system 200 to communicate with other computing devices. In some examples, any computing device represents a plurality of interconnected (whether by intranet or Internet) computer systems, including without limitation, personal computers, mainframes, personal digital assistants (PDAs), digital hubs, smart televisions, set-top boxes, streaming boxes, smartphones and cell phones.

In some examples, a computer system typically includes at least hardware capable of executing machine readable instructions, as well as the software for executing acts (typically machine-readable instructions) that produce a desired result. In some examples, a computer system may include hybrids of hardware and software, as well as computer sub-systems.

In some examples, hardware generally includes at least processor-capable platforms, such as client-machines (also known as personal computers or servers), and hand-held processing devices (such as smart phones, tablet computers, PDAs, or personal computing devices (PCDs), for example). In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into a silicon chip. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, hand-held and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In some examples, more than one database may be implemented.

In some examples, a computer program, such as a plurality of instructions stored on a computer readable medium, such as the computer readable medium, the system memory 204, and/or any combination thereof, may be executed by a processor 202 to cause the processor 202 to carry out or implement in whole or in part the operation of the system 200, one or more of the methods. In some examples, such a processor 202 may execute the plurality of instructions in connection with a virtual computer system.

Figure 3:
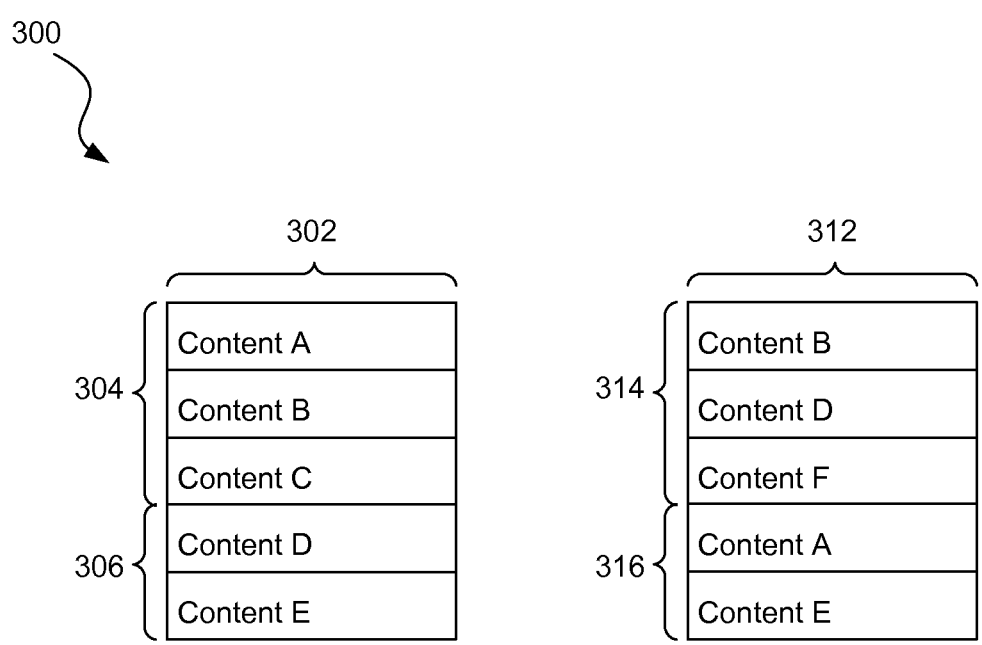
FIG. 3 is a diagram showing illustrative content sets for different content consumers, according to one example of principles described herein.

FIG. 3 is a diagram showing illustrative content sets for different content consumers. According to the present example, a content management module 102 may store content sets 302, 312 that are associated with a specific content consumer. The content sets 302, 312 include content metadata (e.g., 104, FIG. 1) for content available to a content consumer. The content sets may be divided into two categories: consumed content 306, 316 and unconsumed content 304, 314. While the two categories are depicted as being contiguous there is requirement to store or maintain the two categories in such a manner The content sets 302, 312 may represent content that is of interest to the content consumer associated with that content set. Content that is of interest to a content consumer may include content that has been manually selected by a content consumer. For example, a content consumer may select a television series for a DVR to record. All recorded content in that television series may then be included within the content consumer's content set. In some examples, the content set may include automatically selected content. Automatically selected content can be determined by finding content that is similar to that which a content consumer has previously consumed or has manually selected as being of interest.

In the illustrated example, a first content consumer is associated with content set 302. Content set 302 includes unconsumed content 304 that includes Content A, Content B, and Content C. Content set 302 further includes consumed content 306 that includes Content D and Content E. The consumed content 306 is denoted as consumed by the respective content consumer because the content management module was able to determine, through use of the biometric feature detection system, that the content consumer consumed the content.

Similarly, a second content consumer is associated with content set 312. Content set 312 includes unconsumed content 314 that includes Content B, Content D, and Content F. Content set 312 further includes consumed content 316 that includes Content A and Content E. Again, the consumed content 316 is denoted as consumed because the content management module was able to determine, through use of the biometric feature detection system, that the content consumer consumed the content.

The content sets 302, 312 are different because different content consumers may have been present during presentation of a particular piece of content. For example, both content consumers may have been present when Content E was displayed, thus it can be assumed that both content consumers consumed Content E. But, the second content consumer was not present when content D was displayed. Likewise, the first content consumer was not present when content A was displayed.

In some examples, when multiple content consumers are present, a content selection may be provided to the content consumers. The content selection displays only content metadata for content that has not yet been viewed by any of multiple persons present. This may be presented as an intersection of the unconsumed content 306, 316 from both sets 302, 312. Specifically, content E is unconsumed by both the first content consumer and the second content consumer. Thus, Content E represents an intersection of the unconsumed content 306, 316.

Figure 4:
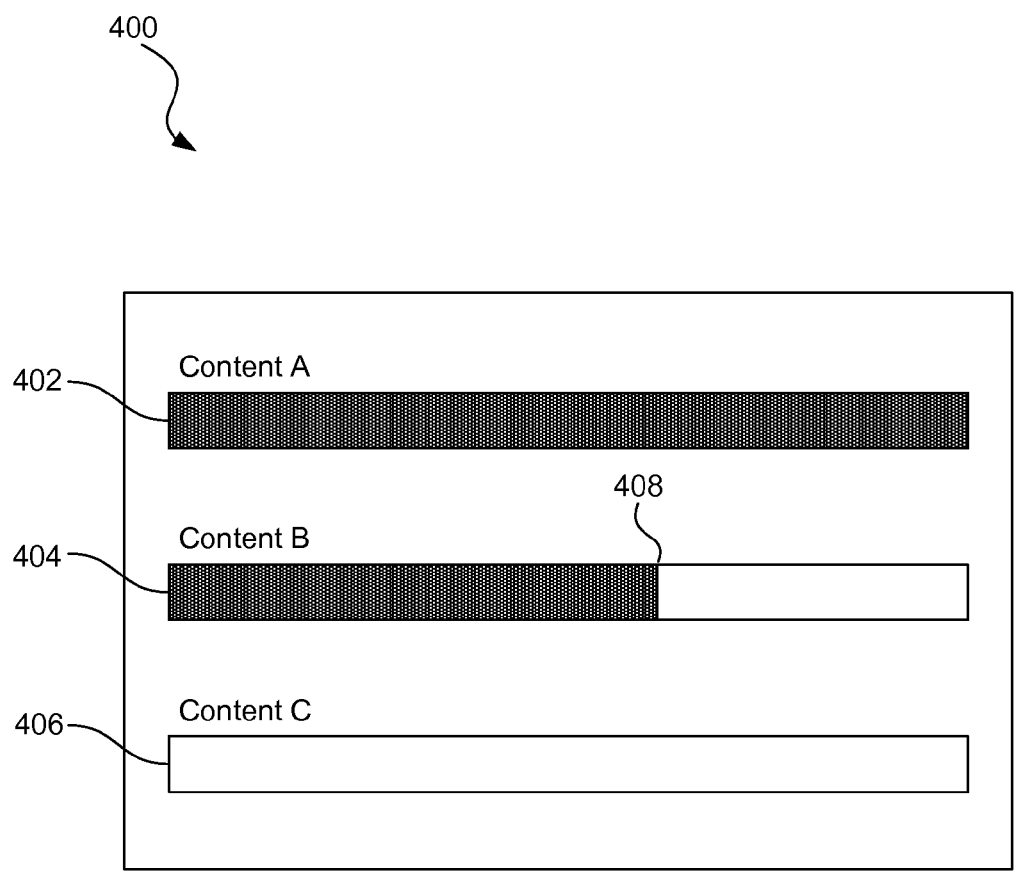
FIG. 4 is a diagram showing an illustrative presentation of lists of available content, according to one example of principles described herein.

FIG. 4 is a diagram showing an illustrative presentation of lists of available content. According to the present example, the status indicator 402 for Content A indicates that Content A is fully consumed, the status indicator 404 for content B indicates that content B is partially consumed, and the status indicator 406 for content C indicates that content C is entirely unconsumed with respect to a specific content consumer.

A piece of content can be indicated as partially consumed if during presentation of a piece of content, and from the perspective of the content module, a content consumer discontinues consumption of the content. For example, if the biometric feature detection system determines that a particular content consumer leaves the room during presentation, it can be assumed that that content consumer has discontinued consumption of the piece of content currently being presented. In some examples, it may be the case that the biometric feature detection system can determine whether a content consumer is present and whether the content consumer is engaged in the consumption of the content being presented. For example, a content consumer may be present during presentation of a piece of content, but the content consumer's eyes may be directed elsewhere. Thus, in the case of video content, it may be assumed that that content consumer is not consuming the content. Thus, the content can be indicated as partially viewed.

In some examples, the point 408 at which a content consumer discontinues consumption of a piece of content can be recorded and stored along with the content set for that content consumer. Thus, when the content consumer wishes to continue consumption of that piece of content, the content consumer may do so at the point 408 at which the content consumer previously stopped consuming the content.

Figure 5:
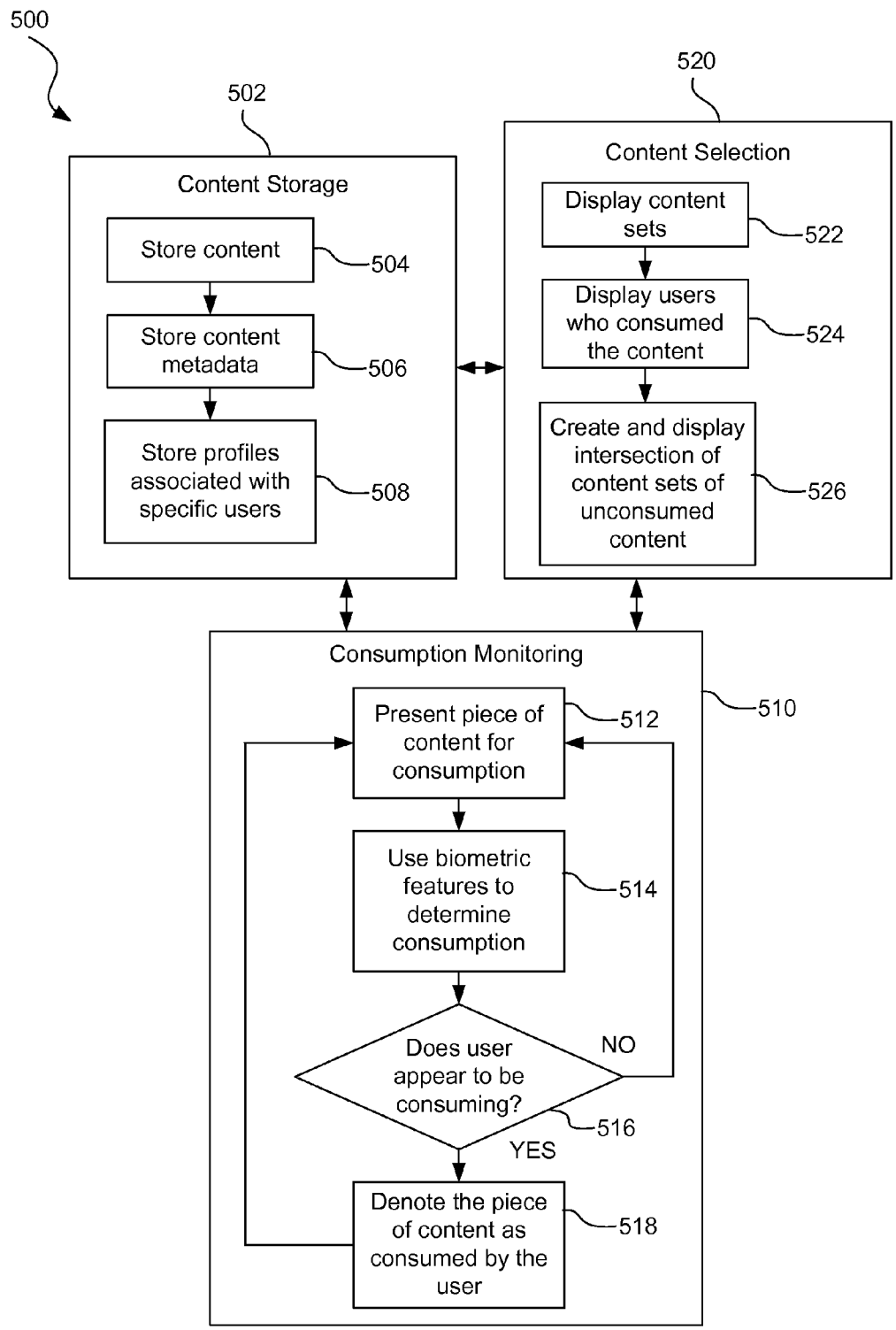
FIG. 5 is a flowchart showing methods for content storage, consumption monitoring, and content presentation, according to one example of principles described herein.

FIG. 5 is a flowchart showing methods 500 for content storage 502, consumption monitoring 510, and content selection 520. According to the present example, content storage 502 includes a step 504 for storing content. Content may be stored remotely on a database controlled, operated, and/or owned by a content service provider. In some examples, content may be stored locally, for example, on a home computer system or other content storage device.

According to the present example, content storage 502 includes a step 506 for storing content metadata. The content metadata may be stored such that it is accessible by the content management module. The content metadata represents the content that is of interest to the plurality of content consumers that interact with the content management module, regardless of whether that content may be currently available.

According to the present example, content storage 502 includes storing profiles associated with specific content consumers. A profile includes a content set of content in which the user has an interest. For example, a particular content set may include metadata for all that pieces of content that are of interest to a specific content consumer. Additionally, a content set may be associated with consumption metadata that indicates what content has been consumed and what content has not been consumed by a particular content consumer. A content set may also be associated with identification metadata that includes biometric features that identify a specific content consumer such as face, voice, retina, etc.

In one example, content consumers may set up profiles with the content management module. The content set that is specific to a content consumer may be associated with that content consumer's profile. In order to obtain the identification metadata for that content user, the biometric feature detection system may be used to obtain that identification metadata. For example, in the case where the biometric feature detection system is a facial recognition system, the content consumer's face may be scanned when the content consumer sets up a profile with the content management module. Thus, when the biometric feature detection system subsequently detects that person's face, the content management module can compare that face with the faces associated with the identification metadata for all profiles available to the content management module. The content management module can then associate that content consumer with the content being presented.

Consumption monitoring 510 includes the presentation of content and the monitoring of consumption of that content. Specifically, which content consumers are consuming which pieces of content is monitored. According to the present example, consumption monitoring 510 includes a step 512 for presenting a piece of content for consumption. The manner of presenting a piece of content varies based on the type of content and the mechanism used to present the content. For example, in the case of video content, presenting the content may include playing the video on a television screen. In the case of text content, presenting the content may include displaying the content on a tablet screen. In the case of audio content, presenting the content may include playing the audio content from a speaker.

According to the present example, consumption monitoring 510 includes a step 514 for using biometric features to determine who is consuming the piece of content being presented. The manner of determining who is consuming content varies based on the type of content and the type of biometric feature detection used. For example, in the case of video content, and a facial recognition biometric feature detection system, consumption may be assumed based on who is within the presentation region of the content.

In some examples, the facial detection system has the functionality to determine whether or not a content consumer who is present is engaged with the content and therefore more likely to be consuming the content. For example, if a content consumer's eyes are directed at the television set, then it can be assumed that that content consumer is consuming the content. If, however, the content consumer's eyes are directed elsewhere, it may be assumed that the content is not being consumed by that content consumer.

According to the present example, if it is determined at step 516 that a content consumer appears to be consuming the content, then it can be denoted that that piece of content has been consumed by that content consumer. Thus, the content management module may update the content set associated with that content consumer to indicate that that content consumer has consumed that particular piece of content as indicated in step 518. The process continues when additional content is presented for consumption. If it is determined that a particular content consumer is not consuming presented content, then no update may be made to the content set associated with that content consumer.

Content selection 520 includes the process of browsing content and receiving an indication that such content has or has not been consumed by a particular content consumer. According to the present example, content selection 520 includes a step 522 for displaying content sets. The content sets are content consumer specific. That is, each content set is associated with a particular content consumer. An operator of the content management module can browse the multiple content sets as desired.

According to the present example, content selection 520 includes a step 524 for displaying who consumed content within the content sets. For example, when viewing a particular content set, it may be indicated what pieces of content have and have not yet been consumed. In some examples, a combined set of content may be displayed. Along with a display of a video content title and representative image, a list of content consumers that have consumed the content may be displayed. In some examples, the content consumers that are interested in that content but have not yet consumed the content may be displayed instead. In some cases, partially consumed content may be indicated as such.

According to the present example, content selection 520 includes a step 526 for creating and displaying an intersection of content sets that have content not consumed by the associated content consumers. For example, if a group of content consumers are present to consume a piece of video content, the intersection result will display a list of content that has not been viewed by any of the present content consumers. This makes it relatively simple to find a piece of content that is new to each present content consumer. The present content consumers can be known based on the biometric feature detection system.

Figure 6:
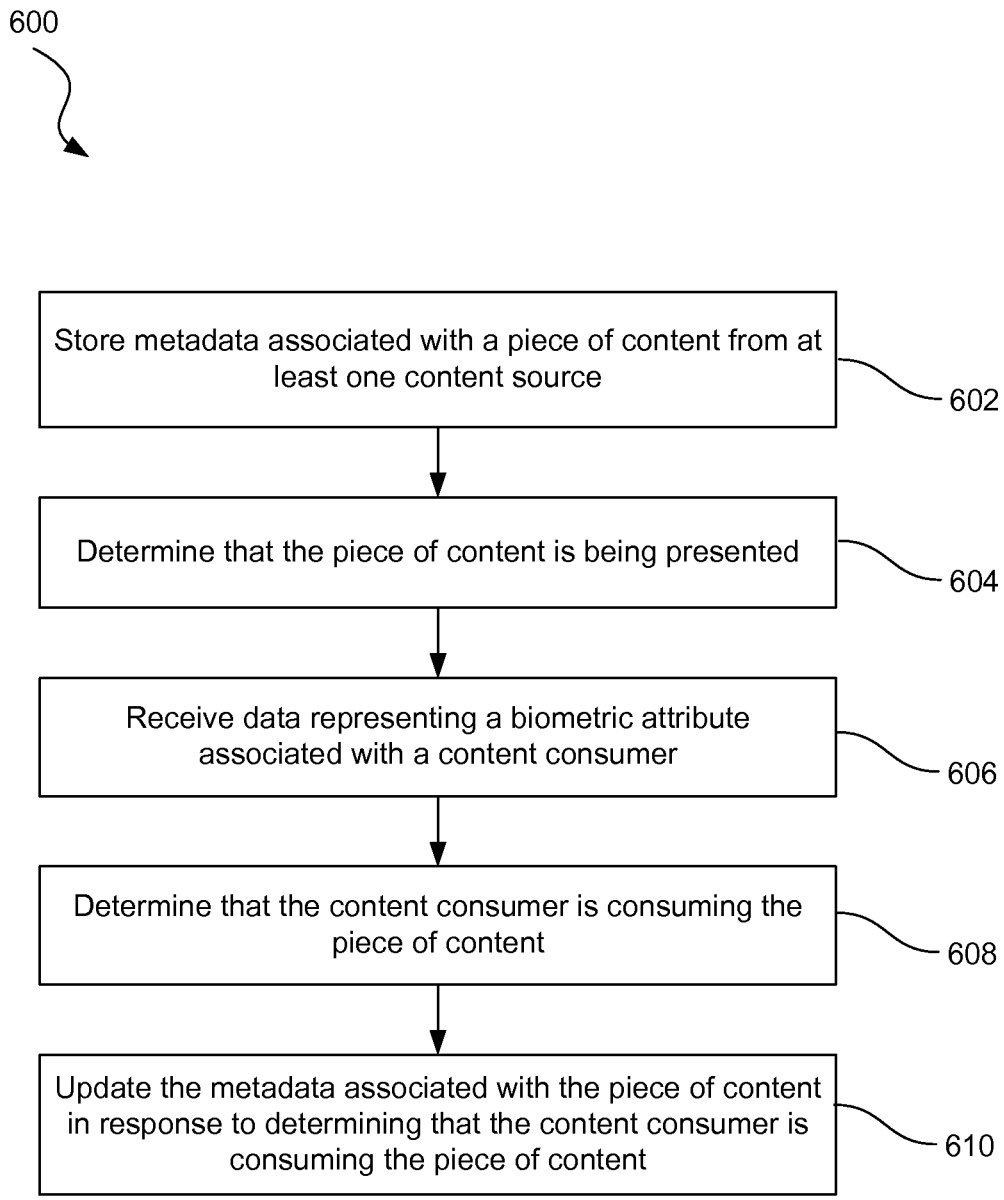
FIG. 6 is a flowchart showing an illustrative method for content management with biometric feature recognition, according to one example of principles described herein.

FIG. 6 is a flowchart showing an illustrative method 600 for content management with biometric feature recognition. According to the present example, the method 600 includes a step 602 for storing metadata associated with a piece of content from at least one content source. The method 600 further includes a step 604 for determining that the piece of content is being presented. The method 600 further includes a step 606 for receiving data representing a biometric attribute associated with a content consumer. The method 600 further includes a step 608 for determining that the content consumer is consuming the piece of content. The method 600 further includes a step 610 for updating the metadata associated with the piece of content in response to determining that the content consumer is consuming the piece of content.

Some examples of processing systems described herein may include non-transitory, tangible, machine readable media that include executable code that when run by one or more processors (e.g., processor 202) may cause the one or more processors to perform the processes of method 600 as described above. Some common forms of machine readable media that may include the processes of methods 600, 700, and 800 for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   storing metadata associated with content from at least one content source, the metadata including a content list for each of a plurality of content consumers, each content list including consumed content and unconsumed content;

determining that content from at least one of the content lists is being presented;

receiving non-content data from a sensor while the content is being presented, the non-content data representing a biometric attribute associated with at least one of the plurality of content consumers;

analyzing the non-content data to identify the at least one of the plurality of content consumers;

determining that the at least one of the plurality of content consumers is consuming the content;

updating the metadata to indicate that the at least one of plurality of content consumers has consumed the content in response to determining that the content consumer is consuming the content;

determining that at least a subset of the plurality of content consumers are within a presentation region of the sensor; and creating a combined content list including only unconsumed content common to each of the subset of the plurality of content consumers.

2. The method of claim 1, wherein creating the combined content list comprises taking an intersection of the unconsumed content from each of the content lists for each of the plurality of content consumers.

3. The method of claim 1, wherein the content source includes one of: a content streaming service or a Digital Video Recording (DVR) service.

4. The method of claim 1, wherein the content comprises one of: a video and audio presentation.

5. The method of claim 1, further comprising, indicating the content as partially viewed in response to determining that the at least one of the plurality of content consumers discontinues consumption during presentation of the content.

6. The method of claim 5, further comprising, indicating a point within the content at which the at least one of the plurality of content consumers discontinued consumption of the content.

7. The method of claim 1, further comprising, associating the at least one of the plurality of content consumers with a series of content in response to determining that the at least one of the plurality of content consumers has consumed content within the series of content.

8. The method of claim 1, further comprising, presenting the combined content list to the plurality of content consumers.

9. A system comprising:
a content consumption mechanism to present content to content consumers;
a biometric feature detection system to identify content consumers; and
a content management module to:
store content metadata associated with content from at least one content source, the metadata including a content list for each of a plurality of content consumers, each content list including consumed content and unconsumed content;
determine that content from at least one of the content lists is being presented through the content consumption mechanism;
receive non-content data from the biometric feature detection system while the content is being presented;
analyze the non-content data to identify at least one of the plurality of content consumers;
determine that the at least one of the plurality of content consumers is consuming the content;
update the metadata to indicate that the at least one of plurality of content consumers has consumed the content in response to determining that the content consumer is consuming the content;
determine that at least a subset of the plurality of content consumers are within a presentation region of the sensor; and
create a combined content list including only unconsumed content common to each of the subset of the plurality of content consumers.

10. The system of claim 9, wherein to create the combined list of content the system is further to take an intersection of unconsumed content from each of the content sets for each of the plurality of content consumers.

11. The system of claim 9, wherein the content management module is further to indicate the content as partially viewed in response to determining that the at least one of the plurality of content consumers discontinues consumption during presentation of the content.

12. The system of claim 11, wherein the content management module is further to indicate a point within the content at which the at least one of the plurality of content consumers exited the presentation region during consumption of the content.

13. The system of claim 9, wherein the content management module is further to associate the at least one of the plurality of content consumers with a series of content in response to determining that the at least one of the plurality of content consumers has consumed content within the series of content.

14. The system of claim 9, wherein the system is further to present the combined list content list to the plurality of content consumers.

15. A non-transitory computer readable medium comprising computer readable code for execution on a processing system, the computer readable program code comprising:
computer readable program code to store metadata associated with content from at least one content source, the metadata including a content list for each of a plurality of content consumers, each content list including consumed content and unconsumed content;
computer readable program code to determine that content is being presented;
computer readable program code to receive non-content data while the content is being presented, the non-content data representing a biometric attribute associated with at least one of the plurality of content consumers;
computer readable program code to identify the at least one of the content consumers based on the non-content data;
computer readable program code to determine that the at least one of the content consumers is consuming the content;
computer readable program code to update the metadata to indicate that the at least one of plurality of content consumers has consumed the content in response to determining that the content consumer is consuming the content;
computer readable program code to determine that at least a subset of the plurality of content consumers are within a presentation region of the sensor; and computer readable program code to create a combined content list including only unconsumed content common to each of the subset of the plurality of content consumers.

16. The non-transitory computer readable medium of claim 15, further comprising computer readable program code to present the combined content list to the plurality of content consumers.

17. The non-transitory computer readable medium of claim 15, further comprising computer readable program code to indicate the content as partially viewed in response to determining that the at least one of the plurality of content consumers discontinues consumption during presentation of the content.

18. The non-transitory computer readable medium of claim 17, further comprising computer readable program code to indicate a point within the content at which the at least one of the plurality of content consumers exited the presentation region during consumption of the content.

19. The non-transitory computer readable medium of claim 15, further comprising computer readable program code to associate the at least one of the plurality of content consumers with a series of content in response to determining that the at least one of the plurality of content consumers has consumed content within the series of content.

* * * * *